United States Patent
Guillemin et al.

(10) Patent No.: US 6,594,027 B1
(45) Date of Patent: Jul. 15, 2003

(54) IMAGE FORMING SYSTEMS, METHODS OF HANDLING MEDIA, AND METHODS OF IDENTIFYING LOCATIONS OF INTERCHANGEABLE MEDIA HANDLING DEVICES RELATIVE TO ONE ANOTHER

(75) Inventors: Gustavo M. Guillemin, Jalisco (MX); Ricardo Osuna Leyva, Jalisco (MX); Lawrence Bert Newell, Jr., Jalisco (MX)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/298,620

(22) Filed: Apr. 23, 1999

(51) Int. Cl.[7] .............................................. G06K 15/00
(52) U.S. Cl. ....................... 358/1.12; 358/1.1
(58) Field of Search ........................... 358/1.1, 1.2, 1.9, 358/1.12, 1.13, 1.14, 1.15, 1.16, 1.17, 1.18, 432, 433; 399/16, 17, 18, 19, 23, 367, 370, 376

(56) References Cited

U.S. PATENT DOCUMENTS 5,262,872 A * 11/1993 Yoshimura et al. ........ 346/33 R
6,356,358 B1 * 3/2002 Kakutani et al. ............. 347/37

* cited by examiner

Primary Examiner—Arthur G. Evans

(57) ABSTRACT

In one aspect, the invention encompasses a method of identifying the location of interchangeable media handling devices relative to one another and relative to an image forming device. A data communication path is provided in parallel data communication with a plurality of media handling devices, and also in data communication with a processor. A power connection path is provided and configured to provide power sequentially to the media handling devices. The media handling devices are initially in an lower power state. Power is provided through the power connection path to the individual media handling devices to change the power state of the media handling devices from the lower power state to an higher power state. The power travels sequentially through the power connection path to each of the media handling devices, and the individual media handling devices send a signal to the processor after they receive power. The processor utilizes the signals received from the media handling devices to identify a relative physical orientation of the media handling devices to one another, and to identify the relative physical orientation of the media handling devices to the image forming device. In another aspect, the invention encompasses a system configured to incorporate the above-described method.

20 Claims, 3 Drawing Sheets

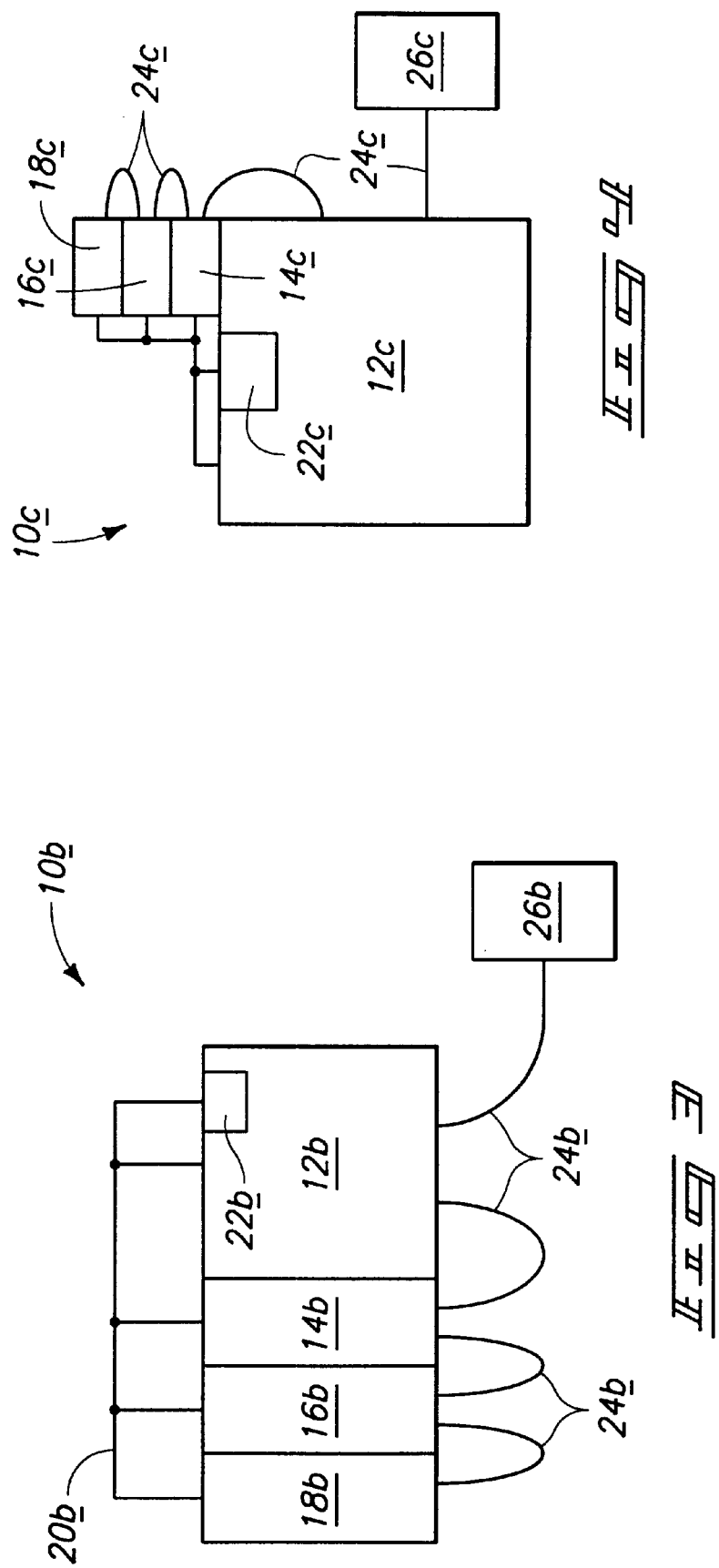

IMAGE FORMING SYSTEMS, METHODS OF HANDLING MEDIA, AND METHODS OF IDENTIFYING LOCATIONS OF INTERCHANGEABLE MEDIA HANDLING DEVICES RELATIVE TO ONE ANOTHER

FIELD OF THE INVENTION

The invention pertains to methods and systems for forming images and handling media. In particular applications, the invention pertains to methods of identifying the location of interchangeable media handling devices relative to one another and relative to an image forming device.

BACKGROUND OF THE INVENTION

A continuing goal of modern image production (such as, for example, document production) is to automate image formation and media handling. Automated image forming devices, such as, for example, printers and copiers, are commonplace, as are media handling devices to be utilized with the image forming devices, such as, for example, media input devices (e.g., paper supply devices) and media output devices (e.g.,sorters and staplers). However, there remains a need for improved methods of automated image formation and media handling.

SUMMARY OF THE INVENTION

In one aspect, the invention encompasses a method of identifying the location of interchangeable media handling devices relative to one another and relative to an image forming device. A data communication path is provided in data communication with a plurality of media handling devices, and also in data communication with a processor. A power connection path is provided and configured to provide power sequentially to the media handling devices. The media handling devices are initially in a lower power state (which can constitute a sleep mode, power save mode, or off mode). Power is provided through the power connection path to the individual media handling devices to change the power state of the media handling devices from the lower power state to a higher power state. The power travels sequentially through the power connection path to each of the media handling devices, and the individual media handling devices send a signal to the processor after they receive power. The processor utilizes the signals received from the media handling devices to identify a relative physical location of the media handling devices to one another, and to identify the relative physical location of the media handling devices to the image forming device.

In another aspect, the invention encompasses an image forming system. The system includes an image forming device and a plurality of media handling devices that define at least one of a media flow path to the image forming device or a media flow path from the image forming device. Any of the media handling devices that define the media flow path from the image forming device are referred to as output devices, and any media handling devices that define the flow path to the image forming device are referred to as input devices. A data communication path is configured to carry signals from the image forming device and the media handling devices. The system includes a processor in data communication with the data communication path and configured to receive the signals from the image forming device and the media handling devices. The system also includes a power connection path configured to provide power sequentially to the media handling devices during a power-up sequence. The media handling devices are configured to send a signal along the data communication path and to the processor as the individual devices are powered up. The processor is configured to received the signals from the media handling devices and utilize such signals to identify a relative orientation of the media handling devices to one another along either the media flow path to the image forming device or the media flow path from the image forming device.

DESCRIPTION OF THE DRAWINGS

FIG. 3 is a diagrammatic, schematic sideview of a particular embodiment image forming and media handling system of the present invention.

FIG. 4 is a diagrammatic, schematic sideview of another particular embodiment image forming and media handling system of the present invention.

DETAILED DESCRIPTION OF THE INVENTION

Figure 1:
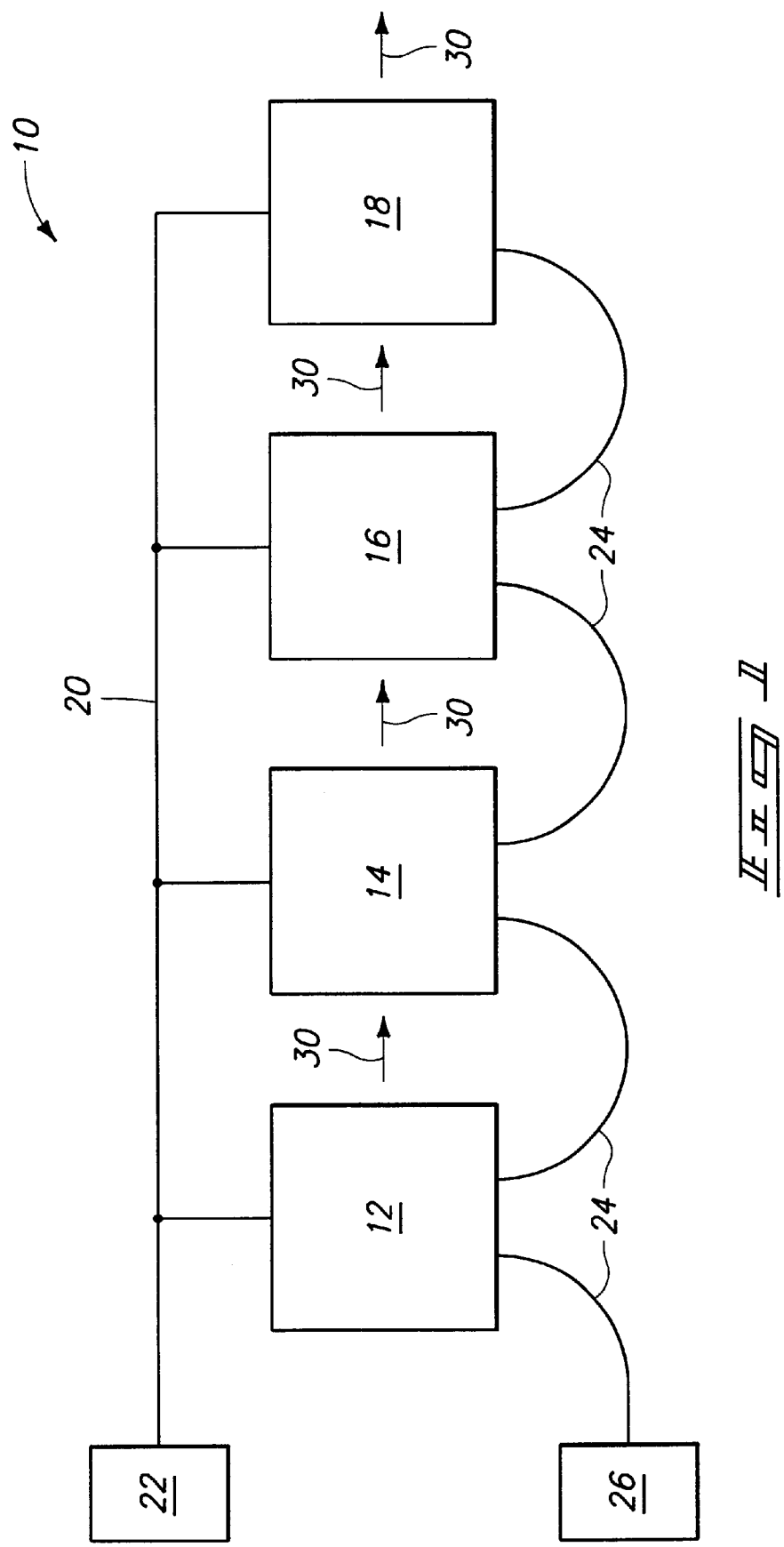
FIG. 1 is a schematic block diagram of an image forming and media handling system encompassed by the present invention.

FIG. 1 is a block diagram view of an image forming and handling system 10 encompassed by the present invention. System 10 comprises a plurality of devices 12, 14, 16 and 18, one of which is an image forming device and the remainder of which are media handling devices. The image forming device can comprise, for example, a copier or a printer; and the media handling devices comprise devices along a media flow path. Media handling devices can include devices which are either input devices relative to the image forming device (such as media supply devices, with exemplary media comprising paper or transparency sheets), output devices relative to the image forming device (such as document sorters or document staplers), or any device along the media flow path. At least some of the media handling devices can be interchangeable with one another, and, in one aspect, the invention enables a processor to identify the relative locations of the interchangeable media handling devices to one another, and to the image forming device.

In an exemplary embodiment, device 12 can be the image forming device, and devices 14, 16 and 18 can be the media handling devices. In the shown embodiment, media handling devices 14, 16 and 18 are all output devices in that all of devices 14, 16 and 18 process output from image forming device 12. Accordingly, a media flow path 30 is defined to flow from image forming device 12 to media handling devices 14, 16 and 18. In other embodiments (such as the below-discussed embodiment of FIG. 2), the media flow path can flow from one or more input media handling devices to the image forming device, and then from the image forming device to one or more output media handling devices.

System 10 comprises a processor 22, and a data communication path 20 in data communication with processor 22. Devices 12, 14, 16, and 18 are in parallel data communication with processor 22 through path 20. In particular embodiments, path 20 can comprise an electrically conductive line which is physically and electrically connected to each of devices 12, 14, 16, and 18. In alternative embodiments, path 20 can comprise a fiber optic line. In yet other alternative embodiments, path 20 can comprise a space across which signals are transmitted from devices 12, 14, 16, and 18 to processor 22 (such signals can be transmitted with, for example, radio-frequency or infrared technologies). It is noted that although processor 22 is shown as a separate component from any of devices 12, 14, 16, and 18, in particular embodiments processor 22 can be provided as a subcomponent of one of devices 12, 14, 16, and 18. For instance, processor 22 can be provided as a subcomponent of image forming device 12. It is also note that the data communication path 20 can comprise a serial communication path between devices 12, 14, 16 and 18, and processor 22.

Power is supplied to devices 12, 14, 16, and 18 through a power connection path 24 which is connected to a power source 26. Power connection path 24 can comprise, for example, an electrically conductive power line. Power connection path 24 is configured to provide power sequentially to devices 12, 14, 16 and 18, and in the shown embodiment connects devices 12, 14, 16 and 18 in series through one another. The sequential power flow to devices 12, 14, 16, and 18 is utilized to cause the devices to be sequentially converted from lower power states to higher power states, as will be discussed in greater detail below. In embodiments which are not shown, power connection path 24 can provide power sequentially to devices 12, 14, 16 and 18 without actually passing in series through one or more of devices 12, 14, 16 and 18. For instance, one or more processors could be utilized instead of the shown series connection to provide sequential power flow to devices 12, 14, 16 and 18.

In an exemplary operation of the shown embodiment, image forming device 12 forms images on media to generate a plurality of documents. Such documents are transferred to media handling devices 14, 16 and 18 to automatically accomplish various operations (such as, for example, sorting and stapling) with the documents.

Prior to the above-discussed document generation and handling, one or more of devices 12, 14, 16 and 18 (preferably two or more, and more preferably all) is provided in a lower power state, with the term "lower power state" indicating that the devices are in a mode other than that utilized for their respective media handling functions. Such mode can correspond to, for example, a suspend or sleep type mode, or a mode wherein no power flows through said one or more of devices 12, 14, 16 and 18. Subsequently, the one or more of devices 12, 14, 16 and 18 are converted from the lower power state to a higher power state, with such "higher power state" corresponding to a media handling mode of the devices. The conversion from the lower power state to the higher power state can be accomplished by initially having no power flowing through line 24 to devices 12, 14, 16 and 18, and subsequently allowing power to flow through line 24 to devices 12, 14, 16 and 18. As power flows through power connection 24, it will sequentially enter devices 12, 14, 16 and 18, and accordingly sequentially convert devices 12, 14, 16 and 18 from their respective lower power states to higher power states. Such conversion can be referred to as a power-up sequence.

In accordance with the present invention, each of media handling devices 14, 16 and 18 is configured to send a signal to processor 22 after the device changes from a lower power state to a higher power state. Also, image forming device 12 can be configured to send a signal to processor 22 as it is turned on. Preferably, the signals sent to processor 22 are generated at an initial stage as the devices 12, 14, 16 and 18 are powered on. Also handling devices 14, 16 and 18 are preferably powered up in a sequence corresponding to the location of devices 14, 16 and 18 along flow path 30. For instance, in the shown embodiment, handling devices 14, 16 and 18 are preferably powered on in a sequence of device 14, then device 16, and finally device 18. The signals received by processor 22 are therefore received in an order corresponding to the order at which devices 14, 16 and 18 are powered up, which in turn corresponds to an order of handling devices 14, 16 and 18 along flow path 30. Processor 22 can thus correlate the order at which a signal is received to a physical location of handling devices 14, 16 and 18 relative to one another and relative to device 12.

Figure 2:
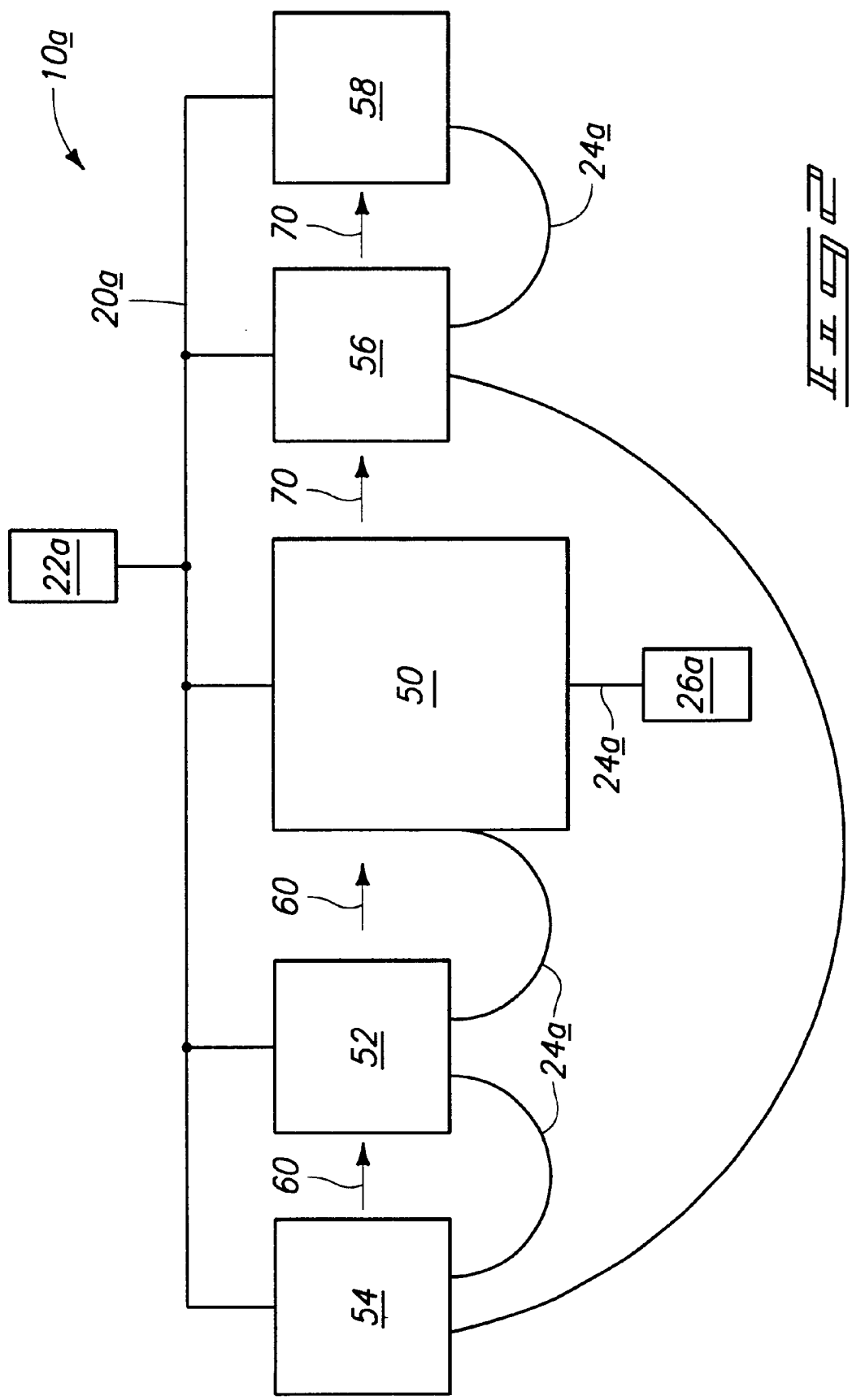
FIG. 2 is a schematic block diagram of another embodiment image forming and media handling system encompassed by the present invention.

A second embodiment image forming and handling system 10a encompassed by the present invention is described with reference to FIG. 2. In referring to FIG. 2, similar number to that utilized in describing FIG. 1 will be used, with the suffix "a" used to identify components of the FIG. 2 embodiment that are analogous to those of the FIG. 1 embodiment.

System 10a comprises a plurality of devices 50, 52, 54, 56 and 58. Device 50 is an image forming device (such as, for example, a copier or printer), devices 52 and 54 are input media handling devices (such as, for example, media supply devices), and devices 56 and 58 are output media handling devices (such as, for example, sorters and staplers).

An input flow path 60 is defined to flow from device 54 through device 52 and to image forming device 50. A media (such as, for example, paper or transparency stock) flows along the input flow path to enter image forming device 50. An output flow path 70 is defined to flow from image forming device 50 to media handling devices 56 and 58. The media flows from image forming device 50 along flow path 70 to be handled by devices 56 and 58.

System 10a comprises a processor 22a, and a data communication path 20a in data communication with processor 22a. Devices 50, 52, 54, 56, and 58 are shown in parallel data communication with processor 22 through path 20a, but can also be in other forms of data communication, such as, for example, serial data communication. In particular embodiments, path 20a can comprise an electrically conductive line which is physically and electrically connected to each of media handling devices 50, 52, 54, 56, and 58. In alternative embodiments, path 20 can comprise a fiber optic line, or a space across which signals are transmitted from devices 50, 52, 54, 56, and 58 to processor 22a. It is noted that although processor 22a is shown as a separate component from any of devices 50, 52, 54, 56, and 58, in alternative embodiments processor 22a can be provided as a subcomponent of one of devices 50, 52, 54, 56, and 58. For instance, processor 22a can be provided as a subcomponent of image forming device 50.

Power is supplied to devices 50, 52, 54, 56 and 58 through a power connection path 24a which is connected to a power source 26a. Power connection path 24a can comprise, for example, an electrically conductive power line. Power connection path 24a is configured to provide power sequentially to devices 50, 52, 54, 56 and 58, and in the shown embodiment connects devices 50, 52, 54, 56 and 58 in series through one another. The sequential power flow to devices 50, 52, 54, 56 and 58 is utilized to cause the devices to be sequentially converted from lower power states to higher power states.

As the power travels to the respective devices, the devices send a signal to processor 22a, and processor 22a can be configured to correlate the order at which signals are received to a physical location of the devices relative to one another and relative to image forming device 50. The signals sent to processor 22a from devices 52, 54, 56 and 58 can be configured to identify if the devices are input or output devices. In preferred embodiments, the power travels through all of either the input or output devices before entering any of the other of the output or input devices. For instance, in the shown embodiment the power travels sequentially from image forming device 50 through all of the input devices (progressing in the preferred embodiment from the input device nearest image forming device 50 to the input device furthest away from device 50), and then to all of the output devices (progressing in the preferred embodiment from the output device nearest image forming device 50 to the output device furthest away from device 50). Such travel through the input devices first and then the output devices (or vice versa), coupled with the devices sending signals that identify them as either input devices or output devices, can enable processor 22a to identify a location of all of the input devices relative to on another and image forming device 50, as well as to identify a location of all of the output devices relative to one another and image forming device 50.

Particular embodiments of systems of the present invention are described with reference to FIGS. 3 and 4, with the suffix "b" utilized to identify components of FIG. 3, and the suffix "c" utilized to identify components of FIG. 4.

Referring to FIG. 3, a system 10b comprises an image forming device 12b and a plurality of media handling devices 14b, 16b and 18b. Devices 14b, 16b and 18b are stackable relative to device 12b, and are interchangeable with one another. Accordingly, a user of system 10b can customize media handling aspects of system 10b simply by interchanging media handling components 14b, 16b and 18b relative to one another. Components 14b, 16b and 18b can correspond to either input devices or output devices. In particular applications (not shown), two stacks of media handling components can be provided relative to device 12b, with one stack corresponding to interchangeable input devices and the other stack corresponding to interchangeable output devices.

System 10b comprises a data communication path 20b and a processor 22b, and further comprises a power connection path 24b. System 10b can be operated in accordance with the procedures described above with reference to systems 10 (FIG. 1) and 10a (FIG. 2).

Referring to FIG. 4, a system 10c comprises an image forming device 12c, and a plurality of media handling devices 14c, 16c and 18c. Media handling devices 14c, 16c and 18c are stacked atop one another, and interchangeable with one another. System 10c further comprises a data communication path 20c and a power connection path 24c. System 10c can be operated in accordance with the procedures described above with reference to system 10 (FIG. 1) or system 10a (FIG. 2). Components 14c, 16c and 18c can correspond to either input devices or output devices. In particular applications (not shown), two stacks of media handling components can be provided relative to device 12c, with one stack corresponding to interchangeable media input devices and the other stack corresponding to interchangeable media output devices.

Media handling functions of systems 10b and 10c can be customized by users simply by varying relative placements of the media handling devices within their respective stacks. Methodology of the present invention enables the processors 22b and 22c of devices 10b and 10c to automatically determine a relative location of the media handling devices within their respective stacks.

What is claimed is:

1. A method of identifying locations of interchangeable media handling devices relative to one another and relative to an image forming device, comprising:
   providing a data communication path in data communication with the media handling devices, and in data communication with a processor;
   providing a power connection path configured to provide power sequentially to the media handling devices, the media handling devices initially being in a lower power state; and
   providing power along the power connection path to the individual media handling devices to change the power state of the media handling devices from the lower power state to a higher power state; the power traveling along the power connection path sequentially to each of the media handling devices; individual of the media handling devices sending a signal to the processor after they receive power; the processor utilizing the signals received from the media handling devices to identify a relative physical location of the media handling devices to one another and to the image forming device.

2. The method of claim 1 wherein the power connection path connects the media handling devices in series through one another.

3. The method of claim 1 wherein the media handling devices comprise at least one of an input device relative to the image forming device or an output device relative to the image forming device, and wherein the image forming device comprises at least one of a copier or a printer.

4. The method of claim 1 wherein the respective signals of the individual media handling devices are sent to the processor in an order in which the individual media handling devices change from the lower power state to the higher power state.

5. The method of claim 1 wherein a signal sent to the processor from a media handling device identifies if the media handling device is an input device relative to the image forming device or an output device relative to the image forming device.

6. The method of claim 1 wherein the data communication path is in parallel data communication with the media handling devices.

7. The method of claim 1 wherein the data communication path is in serial data communication with the media handling devices.

8. The method of claim 1 wherein at least some of the media handling devices are input devices relative to the image forming device, wherein the physical relation of the at least some of the media handling devices to one another defines a media flow path, and wherein the sequence in which power flows along the power connection path to the at least some of the media handling devices corresponds to a reverse of the sequence of the at least some of the media handling devices along the media flow path.

9. The method of claim 1 wherein at least some of the media handling devices are output devices relative to the image forming device, wherein the physical relation of the at least some of the media handling devices to one another defines a media flow path, and wherein the sequence in which power flows along the power connection path to the at least some of the media handling devices corresponds to a sequence of the at least some of the media handling devices along the media flow path.

10. A method of handling media relative to an image forming device, comprising:
   providing an image forming device;
   providing a plurality of media handling devices that define at least one of a media flow path to the image forming device or a media flow path from the image forming device; any media handling devices that define the media flow path from the image forming device being output devices, and any media handling devices that define the flow path to the image forming device being input devices;

providing a data communication line in data communication with the image forming device and the media handling devices;

providing a power connection line which connects each of the media handling devices in series and through one another to the image forming device; the power connection line being thus configured to provide power sequentially to the media handling devices;

providing power to the image forming device to convert the device from a lower power state to a higher power state; the power traveling from the image forming device along a path defined by the power connection line to the media handling devices to sequentially convert the media handling devices from lower power states to higher power states; the media handling devices sending signals to a processor after they receive power; the processor utilizing such signals to identify a relative location of the any input devices to one another along the media flow path to the image forming device and of any output devices to one another along the flow path from the image forming device.

11. The method of claim 10 wherein the signals of individual of the media handling devices are sent to the processor in an order in which the individual media handling devices are turned on.

12. The method of claim 10 wherein the media handling devices include at least one input device and at least one output device.

13. The method of claim 10 wherein the media handling devices include a plurality of input devices which are interchangeable with one another and a plurality of output devices which are interchangeable with one another.

14. An image forming system comprising:

an image forming device;

a plurality of media handling devices that define at least one of a media flow path to the image forming device or a media flow path from the image forming device; any media handling devices that define the media flow path from the image forming device being output devices, and any media handling devices that define the flow path to the image forming device being input devices;

a data communication path configured to carry signals from the image forming device and the media handling devices;

a processor in data communication with the data communication path and configured to receive the signals from the image forming device and the media handling devices;

a power connection path configured to provide power sequentially to the media handling devices during a power-up sequence; and wherein:

each individual of the media handling devices is configured to send a signal along the data communication path and to the processor as the individual device is powered up; and the processor is configured to received the signals from the media handling devices and utilize such signals to identify a relative orientation of the media handling devices to one another along either the media flow path to the image forming device or the media flow path from the image forming device.

15. The system of claim 14 wherein the media handling devices comprise either output devices or input devices stacked against one another, and wherein the media flow path extends along the stacked devices.

16. The system of claim 14 wherein the media handling devices include at least one input device and at least one output device.

17. The system of claim 14 wherein the media handling devices include a plurality of input devices and a plurality of output devices.

18. The system of claim 14 wherein the power connection path connects the media handling devices in series through one another.

19. The system of claim 14 wherein the power connection path comprises an electrically conductive power line that connects the media handling devices in series through one another and to the image forming device.

20. The system of claim 14 wherein the data communication path is in parallel data communication with the media handling devices and the processor.

* * * * *